United States Patent
Park et al.

(10) Patent No.: US 8,987,666 B2
(45) Date of Patent: Mar. 24, 2015

(54) APPARATUS AND METHOD FOR SENSING TEMPERATURE

(75) Inventors: Ho Soo Park, Yongin-si (KR); In Sang Song, Osan-si (KR); Duck Hwan Kim, Goyang-si (KR); Chul Soo Kim, Hwaseong-si (KR); Sang Uk Son, Yongin-si (KR); Jea Shik Shin, Hwaseong-si (KR); Cui Jing, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 13/616,445

(22) Filed: Sep. 14, 2012

(65) Prior Publication Data

US 2013/0099122 A1 Apr. 25, 2013

(30) Foreign Application Priority Data

Oct. 19, 2011 (KR) ........................ 10-2011-0106978

(51) Int. Cl.
*G01J 5/44* (2006.01)
(52) U.S. Cl.
CPC .......................................... *G01J 5/44* (2013.01)
USPC ......................................................... 250/338.1
(58) Field of Classification Search
CPC .................................... G01J 5/44; G01K 11/26
See application file for complete search history.

(56) References Cited

U.S. PATENT DOCUMENTS

| 2005/0035828 | A1 | 2/2005 | Kyoung et al. |
| 2006/0125577 | A1 | 6/2006 | Hsieh et al. |
| 2007/0120625 | A1* | 5/2007 | Larson et al. .................. 333/189 |
| 2008/0067389 | A1* | 3/2008 | Vilain ......................... 250/338.1 |
| 2012/0286161 | A1* | 11/2012 | Raieszadeh et al. ....... 250/338.3 |

FOREIGN PATENT DOCUMENTS

| JP | 2007-159123 A | 6/2007 |
| JP | 2007-535883 A | 12/2007 |
| JP | 2011-041749 A | 3/2011 |

* cited by examiner

*Primary Examiner* — Constantine Hannaher
(74) *Attorney, Agent, or Firm* — NSIP Law

(57) ABSTRACT

A temperature sensing apparatus and method are described to detect a change in a frequency due to a change in a temperature. An infrared light sensing apparatus and method are also provided. The temperature sensing apparatus may include an electrode to generate an electrical signal, a piezoelectric layer to convert the electrical signal into an acoustic wave, and a temperature sensitive layer formed by doping impurities in one or more structures formed on a substrate. Additionally, the infrared light sensing apparatus may convert into heat infrared light incident to an infrared light absorption layer, using an infrared light reflection layer and the infrared light absorption layer. A temperature sensitive layer may detect a change in a resonant frequency based on a change in a temperature of the heat, and may detect a change in infrared light based on the change in the resonant frequency.

29 Claims, 8 Drawing Sheets

APPARATUS AND METHOD FOR SENSING TEMPERATURE

CROSS-REFERENCE TO RELATED APPLICATION(S)

This application claims the benefit under 35 U.S.C. §119 (a) of Korean Patent Application No. 10-2011-0106978, filed on Oct. 19, 2011, in the Korean Intellectual Property Office, the entire disclosure of which is incorporated herein by reference.

BACKGROUND

1. Field

The following description relates to a temperature sensing apparatus and method and an infrared light sensing apparatus and method that may be used in a bulk acoustic wave resonator (BAWR) based on a temperature coefficient of frequency (TCF).

2. Description of Related Art

A bulk acoustic wave resonator (BAWR) refers to an acoustic device that may resonate in a predetermined frequency. A resonant frequency of the BAWR may vary depending on a temperature. Materials forming each layer of the BAWR may each have a temperature coefficient of frequency (TCF), for example a positive TCF, and a negative TCF. The TCF refers to a coefficient indicating a rate at which a resonant frequency changes due to a change in temperature.

In general, most materials forming each layer of the BAWR have negative TCF. For example, sensitivity of a BAWR including materials with a negative TCF may range from about −25 ppm/° C. to −35 ppm/° C. In other words, when each of layers of a BAWR is formed of materials with the negative TCF, temperature detection sensitivity used to detect a change in a resonant frequency due to a change in a temperature is very limited.

Accordingly, there is a desire for a temperature sensing technology that may accurately detect a change in a resonant frequency due to a change in a temperature.

SUMMARY

In accordance with an illustrative example, an apparatus is described for sensing a temperature. The apparatus includes an electrode spaced apart by a distance from a substrate. The apparatus also includes a piezoelectric layer configured to convert an electrical signal into an acoustic wave, wherein the electrical signal is input through the electrode. The apparatus further includes a temperature sensitive layer formed in one or more structures formed on the substrate, wherein the temperature sensitive layer is doped with impurities.

The temperature sensitive layer is formed by doping the impurities in silicon dioxide (SiO2) or silicon nitride (SiN).

The predetermined impurities comprise one or more of boron (B), phosphorus (P), arsenic (As), germanium (Ge), Stibium (Sb), silicon (Si), and aluminum (Al).

The temperature sensitive layer is doped with the impurities using an in-situ process or implantation process.

The apparatus also includes a passivation layer configured to protect the electrode and the piezoelectric layer. The electrode and the piezoelectric layer are formed on the substrate. The temperature sensitive layer is formed in the passivation layer by doping the impurities in the passivation layer.

The apparatus also includes a membrane layer configured to support structures formed on the substrate. The membrane layer is formed on the substrate. The temperature sensitive layer is formed in the membrane layer by doping the impurities in the membrane layer.

The electrode includes a top electrode formed on a top of the piezoelectric layer, and a bottom electrode formed on a bottom of the piezoelectric layer. Temperature sensitive layers are formed on a top and a bottom of the top electrode, and a top and bottom of the bottom electrode layer.

The apparatus also includes a loss compensation layer formed by patterning an edge of the temperature sensitive layer.

The apparatus also includes a loss compensation layer formed in a shape of a doughnut on the temperature sensitive layer.

The loss compensation layer is formed by depositing one or more of molybdenum (Mo), ruthenium (Ru), gold (Au), SiO2, and SiN on the temperature sensitive layer, and by patterning an upper edge of the temperature sensitive layer.

The loss compensation layer is formed by doping the impurities in one or more of SiO2 and SiN, deposited on the temperature sensitive layer, and by patterning an upper edge of the temperature sensitive layer.

The temperature sensitive layer is formed by depositing a phosphosilicate glass (PSG) or boronphosphorussilicate glass (BPSG) in the passivation layer.

In accordance with another illustrative example, a method of sensing a temperature, includes receiving an electrical signal at an electrode spaced apart by a distance from a substrate, converting the electrical signal into an acoustic wave, and doping impurities in one or more structures formed on the substrate.

The doping comprises doping the impurities in silicon dioxide (SiO2) or silicon nitride (SiN).

The method further includes configuring the impurities to comprise one or more of boron (B), phosphorus (P), arsenic (As), germanium (Ge), Stibium (Sb), silicon (Si), and aluminum (Al).

The doping comprises doping the impurities using an in-situ process or implantation process.

The doping comprises doping the impurities in a passivation layer formed on the substrate.

The doping comprises doping the impurities in a membrane layer formed on the substrate.

The doping comprises doping the impurities in a top and a bottom of a top electrode formed on a top of the substrate, and a top and a bottom of a bottom electrode formed on a bottom of the substrate.

The method further includes patterning an edge of the temperature sensitive layer.

The method also includes depositing a Q-factor improvement material on the temperature sensitive layer in a shape of a doughnut.

In accordance with an illustrative example, there is provided an apparatus for sensing infrared light including an infrared light reflection layer configured to upwardly reflect infrared light, wherein the infrared light reflection layer is formed on a substrate. The apparatus includes an electrode spaced apart by a distance from the substrate. The apparatus also includes a piezoelectric layer configured to convert an electrical signal into an acoustic wave, wherein the electrical signal is input through the electrode. The apparatus includes a temperature sensitive layer formed in one or more structures formed on the substrate, wherein the temperature sensitive layer is doped with impurities. The apparatus further includes an infrared light absorption layer configured to absorb the infrared light and to convert the absorbed infrared light into heat, wherein the infrared light absorption layer is formed below the temperature sensitive layer.

The infrared light absorption layer converts the absorbed infrared light into the heat, using one or more of amorphous silicon (a-Si), vanadium oxide (VO2), and chromium (Cr).

The infrared light absorption layer is formed in one or more of the structures located between the infrared light reflection layer and the temperature sensitive layer.

The temperature sensitive layer detects a change in a resonant frequency based on a change in a temperature of the heat using one or more of boron (B), phosphorus (P), arsenic (As), germanium (Ge), Stibium (Sb), silicon (Si), and aluminum (Al).

The infrared light reflection layer reflects the infrared light using one or more of Al and titanium (Ti).

The infrared light absorption layer absorbs the infrared light reflected from the infrared light reflection layer and infrared light incident through the temperature sensitive layer, and converts the absorbed infrared light into heat.

In accordance with a further illustrative example, a method of sensing infrared light includes upwardly reflecting infrared light, receiving an electrical signal at an electrode spaced apart by a distance from a substrate, and converting the electrical signal into an acoustic wave. The method also includes doping impurities one or more structures formed on the substrate, and absorbing the infrared light and converting the absorbed infrared light into heat.

The absorbing comprises converting the absorbed infrared light into the heat, and using one or more of amorphous silicon (a-Si), vanadium oxide (VO2), and chromium (Cr).

The doping comprises detecting a change in a resonant frequency based on a change in a temperature of the heat, and using one or more of boron (B), phosphorus (P), arsenic (As), germanium (Ge), Stibium (Sb), silicon (Si), and aluminum (Al).

The reflecting comprises reflecting the infrared light using one or more of Al and titanium (Ti).

Other features and aspects will be apparent from the following detailed description, the drawings, and the claims.

According to some embodiments, a temperature sensitive layer formed by doping predetermined impurities in structures formed on a substrate enables to more accurately detect a change in a resonant frequency due to a change in a temperature and improve temperature detection sensitivity.

Additionally, according to some embodiments, due to a thermal stability of structures formed on a substrate, it is possible to sense a high temperature, even in a hazardous environment, or even in a space that it is difficult for people to access.

Furthermore, according to some embodiments, a temperature sensitive layer and an infrared light absorption layer, in accordance with the configurations describe above, accurately detect a change in a resonant frequency by detecting a change in a temperature based on absorption of infrared light.

Moreover, according to some embodiments, the temperature sensitive layer and the infrared light absorption layer, in accordance with the configurations describe above, detect a change in infrared light by sensing a temperature based on absorption of infrared light.

Figure 1:
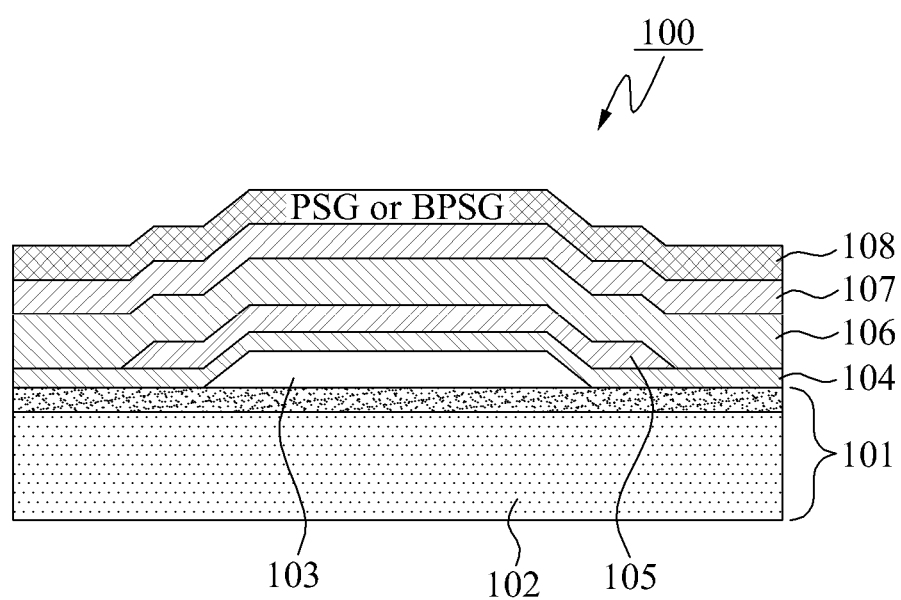
FIG. 1 illustrates an example of a temperature sensing apparatus including a temperature sensitive layer formed in a passivation layer.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions may be omitted for increased clarity and conciseness.

In the following embodiments, an operation of a temperature sensing apparatus used in a bulk acoustic wave resonator (BAWR) will be described, in accordance with an illustrative embodiment. The temperature sensing apparatus may also be used in electronic devices to enable sensing of a change in a frequency due to a change in a temperature.

FIG. 1 illustrates a temperature sensing apparatus 100 including a temperature sensitive layer formed in a passivation layer, in accordance with an illustrative configuration.

Referring to FIG. 1, the temperature sensing apparatus 100 includes a substrate 101, a membrane layer 104, a bottom electrode 105, a piezoelectric layer 106, a top electrode 107, and a passivation layer 108.

At least one structure may be formed on the substrate 101. In one example, the at least one structure may refer to the membrane layer 104, the bottom electrode 105, the piezoelectric layer 106, the top electrode 107, and the passivation layer 108 that are formed by doping predetermined impurities in each of the layers on the substrate 101. The substrate 101 may be doped with silicon (Si) 102, and may include, for example, a silicon wafer.

Additionally, the membrane layer 104 may be formed on the substrate 101. The membrane layer 104 may be formed on an edge of the substrate 101, so that a cavity 103 may be formed between the substrate 101 and the membrane layer 104. The cavity 103 may have, for example, a circular shape, an oval shape, a semicircular shape, or one of various polygonal shapes, such as a tetragonal shape, a trapezoidal shape, or a rhombic shape.

The membrane layer 104 may be used to support the other structures formed on the substrate 101. For example, the membrane layer 104 may support the bottom electrode 105, the piezoelectric layer 106, the top electrode 107, and the passivation layer 108.

The membrane layer 104 may be formed by depositing on the substrate 101 silicon dioxide (SiO2) or silicon nitride (SiN).

The bottom electrode 105 and the top electrode 107 may each be spaced apart by a predetermined distance from the substrate 101. The bottom electrode 105 and the top electrode 107 may be used as an output electrode and an input electrode to apply an electrical signal, such as a radio frequency (RF) signal, to the piezoelectric layer 106. In an example, when the top electrode 107 is used as an input electrode, the bottom electrode 105 may be used as an output electrode. In another example, when the bottom electrode 105 is used as an input electrode, the top electrode 107 may be used as an output electrode. The bottom electrode 105 may be formed by depositing molybdenum (Mo) on the membrane layer 104. Additionally, the top electrode 107 may be formed by depositing ruthenium (Ru) on the piezoelectric layer 106.

The piezoelectric layer 106 may convert into an acoustic wave an electrical signal input through or received at the bottom electrode 105 and the top electrode 107. For example, when a time-varying electric field is applied to the top electrode 107, the piezoelectric layer 106 may convert an electrical signal, input from the top electrode 107, into a physical vibration. The piezoelectric layer 106 may convert the physical vibration into an acoustic wave. Subsequently, the piezoelectric layer 106 may generate a bulk acoustic wave in the same direction as the physical vibration within a c-axis oriented piezoelectric thin film using the applied electric field. The piezoelectric layer 106 may then convert the electrical signal into the acoustic wave. In this example, the c-axis oriented piezoelectric thin film may be used to effectively perform piezoelectric coupling. The c-axis may be identically aligned to a z-axis of a bulk acoustic wave resonator (BAWR).

Depositing aluminum nitride (AlN), zinc oxide (ZnO), or lead zirconate titanate (PZT) on the bottom electrode 105 may form the piezoelectric layer 106.

The passivation layer 108 may be formed by depositing SiO2 on the top electrode 107. Additionally, using SiO2, the passivation layer 108 may protect the other structures formed on the substrate 101. For example, the membrane layer 104, the bottom electrode 105, the piezoelectric layer 106, and the top electrode 107 may be protected by the passivation layer 108 using SiO2. The passivation layer 108 may be formed by depositing SiN, or a combination of SiO2 and SiN on the top electrode 107, instead of depositing SiO2.

In the following descriptions, a passivation layer may refer to a temperature sensitive layer including, but not limited to, a phosphosilicate glass (PSG) or a boronphosphorussilicate glass (BPSG). The PSG may be formed by doping phosphorus (P) in SiO2, and the BPSG may be formed by doping boron (B) and P in SiO2.

The temperature sensitive layer may be formed by doping predetermined impurities in one or more of the structures formed on the substrate 101. The predetermined impurities may include, but not limited to, one or more of B, P, arsenic (As), germanium (Ge), Stibium (Sb), Si, and aluminum (Al).

Additionally, the temperature sensitive layer may be formed by doping the predetermined impurities in SiO2 or SiN deposited on the passivation layer 108 using an in-situ process or an implantation process. In an example, when the in-situ process is used, a temperature sensitive layer may be formed by depositing SiO2 together with the predetermined impurities on SiO2 deposited on the passivation layer 108.

In another example, SiN may be deposited together with the predetermined impurities, instead of SiO2 being deposited. For example, the passivation layer 108 may be formed by depositing a PSG or BPSG, namely a temperature sensitive layer. In other words, the temperature sensitive layer may be formed by depositing the PSG or BPSG on SiO2. When the PSG is used, the temperature sensitive layer may be formed in the passivation layer 108 by doping SiO2 together with P on SiO2. Additionally, when the BPSG is used, the temperature sensitive layer may be formed in the passivation layer 108 by doping, on SiO2, SiO2 with B and P. In this instance, SiN may be deposited on SiO2, instead of SiO2 being deposited.

The temperature sensing apparatus 100 may form the temperature sensitive layer using the in-situ process as described above. As a result, a temperature coefficient of frequency (TCF) may be increased, so that temperature detection sensitivity may be improved. Specifically, the temperature sensing apparatus 100 may sense a temperature by detecting a change in a resonant frequency, based on a change in a piezoelectric modulus, hardness, density, and a dielectric permittivity of a thin film. The TCF refers to a coefficient indicating a rate at which a resonant frequency changes due to a change in temperature. For example, when a temperature sensitive layer is formed in the passivation layer 108 using the in-situ process, the temperature detection sensitivity may be increased from a range of −23 ppm/° C. to −35 ppm/° C. to a range of −80 ppm/° C. −90 ppm/° C., prior to forming the temperature sensitive layer.

In another example, when the implantation process is used, SiO2 or SiN may be deposited in the passivation layer 108. In other words, SiO2 or SiN may be deposited on SiO2 deposited to form the passivation layer 108. Subsequently, predetermined impurities may be doped on the deposited SiO2 or SiN so that a temperature sensitive layer may be formed in the passivation layer 108. Accordingly, the temperature sensing apparatus 100 may control the TCF to be reduced by forming the temperature sensitive layer using the implantation process as described above.

Figure 2:
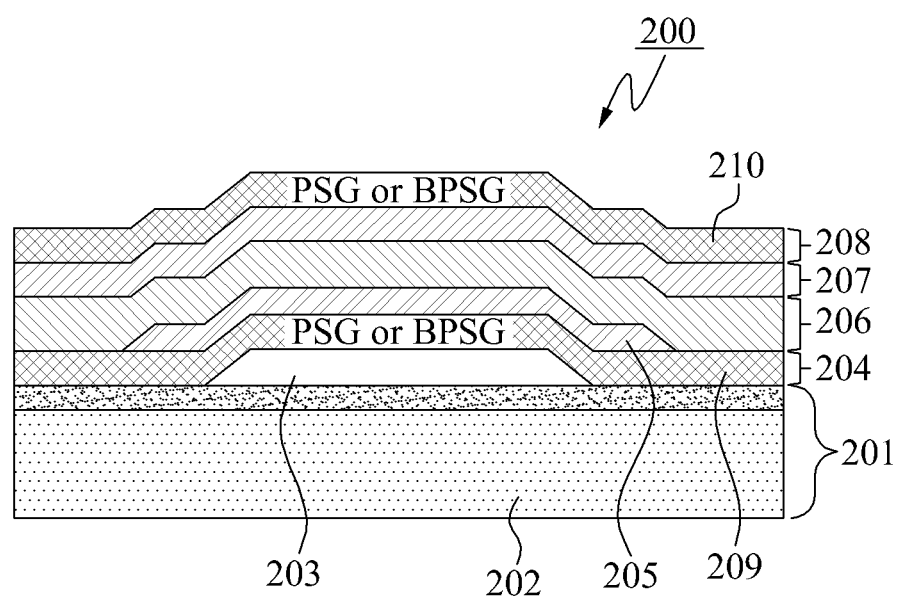
FIG. 2 illustrates an example of a temperature sensing apparatus including temperature sensitive layers formed in a passivation layer and a membrane layer.

FIG. 2 illustrates a temperature sensing apparatus 200 including temperature sensitive layers formed in a passivation layer and a membrane layer, in accordance with an illustrative example.

Referring to FIG. 2, the temperature sensing apparatus 200 includes a substrate 201, a membrane layer 204, a bottom electrode 205, a piezoelectric layer 206, a top electrode 207, and a passivation layer 208.

The substrate 201, the membrane layer 204, the bottom electrode 205, the piezoelectric layer 206, the top electrode 207, and the passivation layer 208 of FIG. 2 may perform substantially the same functions as the substrate 101, the membrane layer 104, the bottom electrode 105, the piezoelectric layer 106, the top electrode 107, and the passivation layer 108 of FIG. 1, respectively, and accordingly further description thereof will be omitted.

A plurality of layers may be laminated on the substrate 201. Structures may be formed by doping predetermined impurities in each of the layers. The substrate 201 may be doped with Si 202, and may include, for example, a silicon wafer.

The membrane layer 204 may be formed on the substrate 201. Specifically, the membrane layer 204 may be formed on an edge of the substrate 201, so that a cavity 203 may be formed between the substrate 201 and the membrane layer 204. The cavity 203 may have, for example, a circular shape, an oval shape, a semicircular shape, or various polygonal shapes, such as a tetragonal shape, a trapezoidal shape, or a rhombic shape.

The membrane layer 204 may be formed by depositing SiO2 or SiN on the substrate 201. Also, the membrane layer 204 may be used to support the other structures formed on the substrate 201. For example, the membrane layer 204 may support, using SiO2 or SiN, the bottom electrode 205, the piezoelectric layer 206, the top electrode 207, and the passivation layer 208.

A first temperature sensitive layer may be formed by doping predetermined impurities in the membrane layer 204, using the in-situ process or implantation process. The predetermined impurities may include one or more of B, P, As, Ge, Sb, Si, and Al. In an example, when the in-situ process is used, the first temperature sensitive layer may be formed by simultaneously depositing SiO2 and the predetermined impurities in the membrane layer 204, which may be formed by depositing SiO2 or SiN on the substrate 201. In one example, SiN may be used instead of SiO2. In another example, when the implantation process is used, SiO2 or SiN may be deposited on the substrate 201. Additionally, SiO2 or SiN may be further deposited on the substrate 201 on which SiO2 or SiN is deposited, and subsequently predetermined impurities may be doped on SiO2 or SiN. Accordingly, the first temperature sensitive layer may be formed in the membrane layer 204.

The bottom electrode 205 may be formed by depositing Mo on the membrane layer 204. Additionally, the bottom electrode 205 may be used as an input electrode or an output electrode to apply an electrical signal to the piezoelectric layer 206. The top electrode 207 may be formed by depositing Ru on the piezoelectric layer 206. Additionally, the top electrode 207 may be used as an input electrode or an output electrode to apply an electrical signal to the piezoelectric layer 206. In an example, when the top electrode 207 is used as an input electrode, the bottom electrode 205 may be used as an output electrode. In another example, when the bottom electrode 205 is used as an input electrode, the top electrode 207 may be used as an output electrode.

The piezoelectric layer 206 may convert an electrical signal received through the top electrode 207 and the bottom electrode 205 into an acoustic wave.

In an example, when the top electrode 207 is used as an input electrode, the piezoelectric layer 206 may receive an electrical signal from the top electrode 207, and may convert the electrical signal into a physical vibration. Additionally, within an oriented piezoelectric thin film, the piezoelectric layer 206 may generate an acoustic wave in the same direction as the physical vibration. In this example, the piezoelectric layer 206 may be formed by depositing AlN on the bottom electrode 205.

The passivation layer 208 may be used to protect the other structures formed on the substrate 201.

A second temperature sensitive layer may be formed by doping predetermined impurities in the passivation layer 208. The predetermined impurities may include, but not limited to, one or more of B, P, As, Ge, Sb, Si, and Al.

Similar to the first temperature sensitive layer, the second temperature sensitive layer may be formed by doping the predetermined impurities in the passivation layer 208 using the in-situ process or implantation process. In an example, the second temperature sensitive layer may formed by depositing a PSG or BPSG on the passivation layer 208 using the in-situ process. In another example, the second temperature sensitive layer may formed by doping either P, or B and P in the passivation layer 208 using the implantation process.

As described above, the first temperature sensitive layer and second temperature sensitive layer may be formed by doping the predetermined impurities in the membrane layer 204 and the passivation layer 208, respectively, using the in-situ process. Accordingly, the temperature detection sensitivity may be increased from a range of −23 ppm/° C. to −35 ppm/° C. to a range of −230 ppm/° C. −280 ppm/° C.

Figure 3:
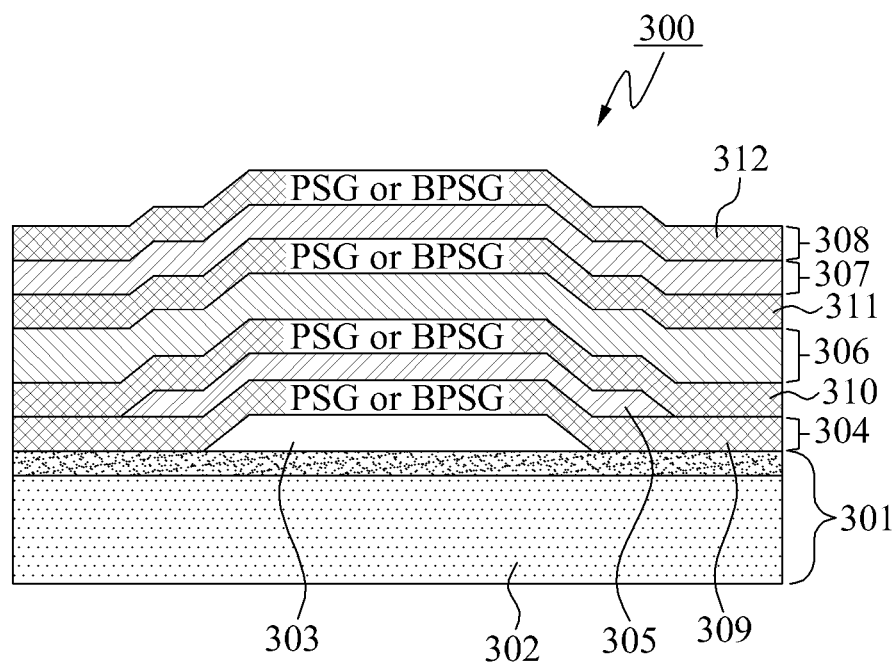
FIG. 3 illustrates an example of a temperature sensing apparatus including temperature sensitive layers sandwiched between structures.

FIG. 3 illustrates a temperature sensing apparatus 300 including temperature sensitive layers sandwiched between structures.

Referring to FIG. 3, the temperature sensing apparatus 300 includes a substrate 301, a membrane layer 304, a bottom electrode 305, a piezoelectric layer 306, a top electrode 307, a passivation layer 308, a first temperature sensitive layer 309, a second temperature sensitive layer 310, a third temperature sensitive layer 311, and a fourth temperature sensitive layer 312.

The substrate 301, the membrane layer 304, the bottom electrode 305, the piezoelectric layer 306, the top electrode 307, and the passivation layer 308 of FIG. 3 may perform substantially the same functions as the substrate 101, the membrane layer 104, the bottom electrode 105, the piezoelectric layer 106, the top electrode 107, and the passivation layer 108 of FIG. 1, respectively, and accordingly further description thereof will be omitted.

As illustrated in FIG. 3, the first temperature sensitive layer 309 through the fourth temperature sensitive layer 312 may be sandwiched between structures formed on the substrate 301. For example, each of the first temperature sensitive layer 309 through the fourth temperature sensitive layer 312 may be formed between two of the structures. In other words, n temperature sensitive layers may be formed every time predetermined impurities are doped between two of the structures. Four temperature sensitive layers are formed as illustrated in FIG. 3; however, a person of ordinary skill in the relevant art will appreciate that a number of temperature sensitive layers may vary. Also, there is no limit to the number of structures to form a temperature sensitive layer. Accordingly, three temperature sensitive layers, or at least five temperature sensitive layers may be formed. In one example, the number of temperature sensitive layers formed between the structures may be limited to until a TCF is equal to or less than a predetermined reference TCF.

Specifically, the TCF of the temperature sensing apparatus 300 may be increased as the number of temperature sensitive layers increases. For example, when the TCF becomes greater than the reference TCF, resonance characteristics may be reduced. Accordingly, the reference TCF may be set, in advance, as an upper limit to increase the TCF within a range in which the resonance characteristics are not reduced.

A plurality of layers may be laminated on the substrate 301, and structures may be formed by doping predetermined impurities in each of the layers. The substrate 301 may be doped with Si 302.

The membrane layer 304 may be formed on an edge of the substrate 301, so that a cavity 303 may be formed between the substrate 301 and the membrane layer 304.

The first temperature sensitive layer 309 may be formed by doping predetermined impurities in the membrane layer 304, using an in-situ process or implantation process. The predetermined impurities may include one or more of B, P, As, Ge, Sb, Si, and Al. The forming of the first temperature sensitive layer 309 in the membrane layer 304 using the in-situ process or implantation process may be performed in the same manner as the forming of the first temperature sensitive layer of FIG. 2, and, accordingly, further description thereof will be omitted.

The bottom electrode 305 may be formed by depositing Mo on the membrane layer 304. The bottom electrode 305 may be used to apply an electrical signal to the piezoelectric layer 306.

The second temperature sensitive layer 310 may be formed by depositing the predetermined impurities on the bottom electrode 305 using the in-situ process or implantation process. In other words, the second temperature sensitive layer 310 may be located between the bottom electrode 305 and the piezoelectric layer 306.

In an example, when the in-situ process is used, the second temperature sensitive layer 310 may be formed by depositing SiO2 together with the predetermined impurities on Mo deposited on the bottom electrode 305. In this example, SiN may be used instead of SiO2.

In another example, when the implantation process is used, the second temperature sensitive layer 310 may be formed between the bottom electrode 305 and the piezoelectric layer 306, by depositing SiO2 on Mo, which is deposited on the bottom electrode 305, and by doping the predetermined impurities in SiO2 deposited on Mo. In this example, SiN may be used instead of SiO2.

The piezoelectric layer 306 may be formed by depositing AlN on the second temperature sensitive layer 310. In other words, the piezoelectric layer 306 may be located between the second temperature sensitive layer 310 and the third temperature sensitive layer 311. Additionally, the piezoelectric layer 306 may convert, into an acoustic wave, an electrical signal input through or received at the top electrode 307 and the bottom electrode 305.

The third temperature sensitive layer 311 may be formed by doping the predetermined impurities on the piezoelectric layer 306, using the in-situ process or implantation process. In other words, the third temperature sensitive layer 311 may be located between the piezoelectric layer 306 and the top electrode 307.

The top electrode 307 may be formed by depositing Ru on the third temperature sensitive layer 311. The top electrode 307 may be used to apply an electrical signal to the piezoelectric layer 306. In an example, when the top electrode 307 is used as an input electrode, the bottom electrode 305 may be used as an output electrode. In another example, when the bottom electrode 305 is used as an input electrode, the top electrode 307 may be used as an output electrode.

The passivation layer 308 may be formed by depositing SiO2 on the top electrode 307, and may be used to protect the other structures formed on the substrate 301.

The fourth temperature sensitive layer 312 may be formed by doping predetermined impurities in the passivation layer 308 and using the in-situ process or implantation process. The predetermined impurities may include one or more of B, P, As, Ge, Sb, Si, and Al.

In an example, when the in-situ process is used, the fourth temperature sensitive layer 312 may be formed by depositing SiO2 together with the predetermined impurities on SiO2 deposited on the top electrode 307. In this example, to form the fourth temperature sensitive layer 312, SiN and the predetermined impurities may be deposited on SiO2, which is deposited on the top electrode 307. For example, a PSG or BPSG may be deposited on SiO2 deposited on the top electrode 307, to form the fourth temperature sensitive layer 312.

In another example, when the implantation process is used, the fourth temperature sensitive layer 312 may be formed in the passivation layer 308 by depositing SiO2 or SiN on SiO2, which is deposited on the top electrode 307. The fourth temperature sensitive layer 312 may be continued to be formed in the passivation layer 308 by doping the predetermined impurities on SiO2 or SiN.

As described above, the first temperature sensitive layer 309 through the fourth temperature sensitive layer 312 may be sandwiched between the structures. In other words, the first temperature sensitive layer 309 and the second temperature sensitive layer 310 may be formed on a bottom and top of the bottom electrode 305, respectively. Additionally, the third temperature sensitive layer 311 and the fourth temperature sensitive layer 312 may be formed on a bottom and top of the top electrode 307, respectively.

Figure 4:
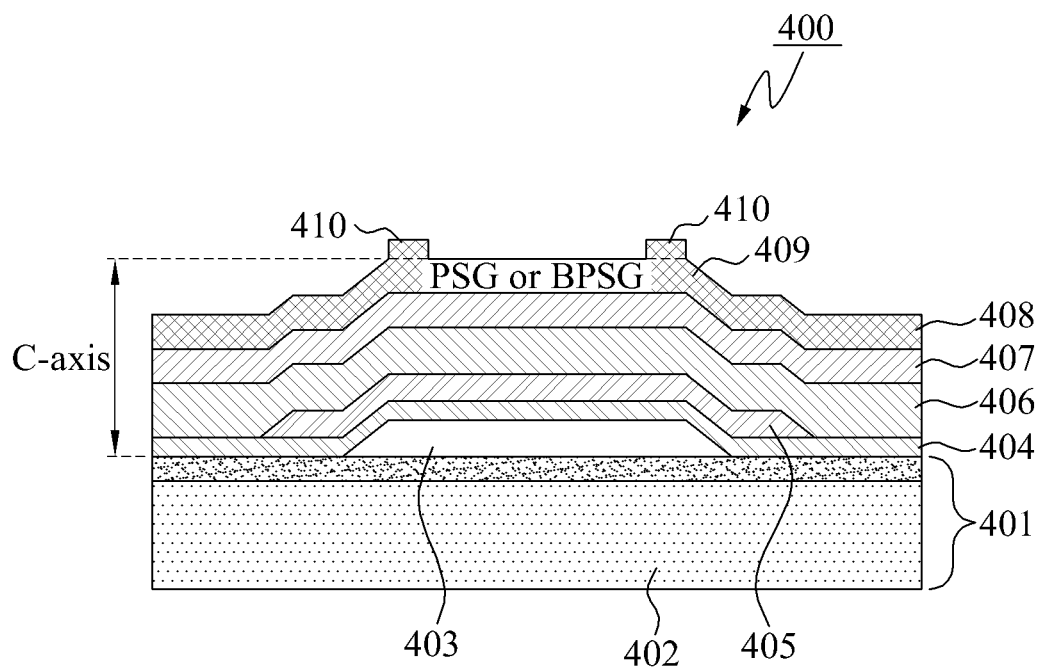
FIG. 4 illustrates an example of a temperature sensing apparatus including a loss compensation layer with a doughnut shape.

FIG. 4 illustrates a temperature sensing apparatus 400 including a loss compensation layer with a doughnut shape.

Referring to FIG. 4, the temperature sensing apparatus 400 includes a substrate 401, a membrane layer 404, a bottom electrode 405, a piezoelectric layer 406, a top electrode 407, a passivation layer 408, a temperature sensitive layer 409, and a loss compensation layer 410.

The substrate 401, the membrane layer 404, the bottom electrode 405, the piezoelectric layer 406, the top electrode 407, the passivation layer 408, and the temperature sensitive layer 409 of FIG. 4 may perform substantially the same functions as the substrate 101, the membrane layer 104, the bottom electrode 105, the piezoelectric layer 106, the top electrode 107, the passivation layer 108, and the temperature sensitive layer of FIG. 1, respectively, and accordingly further description thereof will be omitted. The substrate 401 may be doped with Si 402.

The passivation layer 408 may be formed by depositing SiO2 on the top electrode 407. Subsequently, the temperature sensitive layer 409 may be formed in the passivation layer 408 by doping predetermined impurities on the deposited SiO2 using SiO2 or SiN by an in-situ process or implantation process.

The loss compensation layer 410 may be formed in a shape of a doughnut by patterning an upper edge of the temperature sensitive layer 409. Additionally, the loss compensation layer 410 may be formed by etching, instead of patterning, the upper edge of the temperature sensitive layer 409.

In an example, the loss compensation layer 410 may be formed by depositing, for example, one or more of Mo, Ru, gold (Au), SiO2, and SiN on the temperature sensitive layer 409, and by patterning the upper edge of the temperature sensitive layer 409 in the shape of a doughnut.

In another example, the loss compensation layer 410 may be formed by doping predetermined impurities on the temperature sensitive layer 409, and by patterning, in the shape of a doughnut, the upper edge of the temperature sensitive layer 409 on which the predetermined impurities are doped. The predetermined impurities may include, for example, one or more of B, P, As, Ge, Sb, Si, and Al.

To minimize a loss, a longitudinal wave of an acoustic wave needs to be reflected in contact with an upper portion of the temperature sensitive layer 409 and with air 403 below the membrane layer 404. For example, waves other than a transverse wave of the acoustic wave may spread along a connection line in an edge of the temperature sensing apparatus 400, without coming into contact with the air 403 and, as a result, a loss may occur. Subsequently, the loss compensation layer 410 may generate an impedance difference, and may reflect waves other than the longitudinal wave, so that the loss may be reduced or eliminated.

In other words, the loss compensation layer 410 may be formed in the shape of the doughnut in the upper edge of the temperature sensitive layer 409. The loss compensation layer 410 may reduce or eliminate a loss of the acoustic wave by reflecting once again the acoustic wave that is reflected from a surface of the temperature sensitive layer 409 towards the membrane layer 404.

The loss compensation layer 410 has a doughnut shape as illustrated in FIG. 4. However, the loss compensation layer 410 is not limited to this shape as other shapes may be used to achieve the configuration and advantages of this layer. Accordingly, the loss compensation layer 410 may have various polygonal shapes other than the doughnut shape. As a thickness of the loss compensation layer 410 is increased, a TCF of the temperature sensing apparatus 400 may be reduced, which may result in a reduction in temperature detection sensitivity. Thus, the loss compensation layer 410 may be formed in various forms on the temperature sensitive layer 409, while preventing a reduction in the TCF of the temperature sensing apparatus 400.

Figure 5:
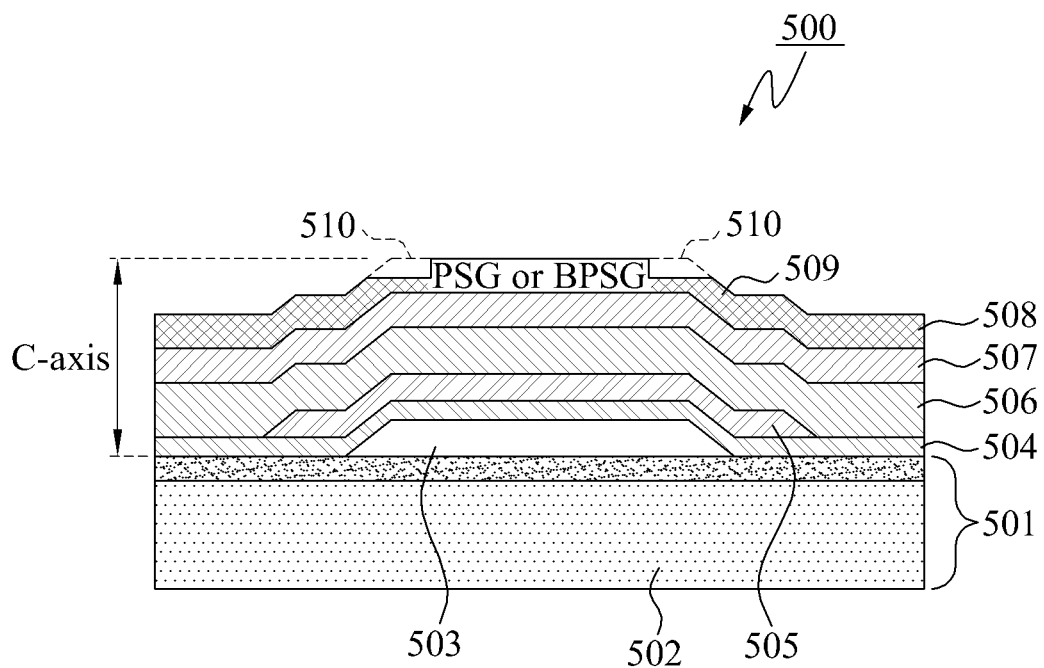
FIG. 5 illustrates an example of a temperature sensing apparatus including a loss compensation layer formed through patterning.

FIG. 5 illustrates a temperature sensing apparatus 500 including a loss compensation layer formed through patterning.

Referring to FIG. 5, the temperature sensing apparatus 500 includes a substrate 501, a membrane layer 504, a bottom electrode 505, a piezoelectric layer 506, a top electrode 507, a passivation layer 508, a temperature sensitive layer 509, and a loss compensation layer 510.

The substrate 501, the membrane layer 504, the bottom electrode 505, the piezoelectric layer 506, the top electrode 507, the passivation layer 508, and the temperature sensitive layer 509 of FIG. 5 may perform substantially the same functions as the substrate 101, the membrane layer 104, the bottom electrode 105, the piezoelectric layer 106, the top electrode 107, the passivation layer 108, and the temperature sensitive layer of FIG. 1, and accordingly further description thereof will be omitted. The substrate 501 may be doped with Si 502.

The passivation layer 508 may be formed by depositing SiO2 on the top electrode 507. Subsequently, the temperature sensitive layer 509 may be formed in the passivation layer 508 by doping predetermined impurities on the deposited SiO2 using SiO2 or SiN by an in-situ process or implantation process.

The loss compensation layer 510 may be formed by patterning an edge of the temperature sensitive layer 509. For example, the loss compensation layer 510 may be formed by etching the edge of the temperature sensitive layer 509 in the shape of a doughnut, and may reduce acoustic impedance. At a point in which the acoustic impedance is reduced, an acoustic wave may be reflected again towards the membrane layer 504, and, as a result, a loss of the acoustic wave may be reduced or eliminated. In other words, as the acoustic impedance is reduced in the loss compensation layer 510 formed by etching the edge of the temperature sensitive layer 509, the loss compensation layer 510 may reflect the acoustic wave towards the membrane layer 504.

The loss compensation layer 510 has a doughnut shape as illustrated in FIG. 5. However, the loss compensation layer 510 is not limited to this shape as other shapes may be used to achieve the configuration and advantages of this layer. Accordingly, the loss compensation layer 510 may have various shapes other than the doughnut shape.

Additionally, the temperature sensing apparatuses 400 and 500 may be configured by adding the loss compensation layers 410 and 510, respectively, to the temperature sensing apparatus 100 of FIG. 1; however, there is no limitation thereto. Accordingly, the loss compensation layers 410 and 510 may be further included in the temperature sensing apparatuses 200 and 300 of FIGS. 2 and 3. In an example of a temperature sensing apparatus, temperature sensitive layers may be respectively formed in a passivation layer and a membrane layer, and a loss compensation layer may be formed by patterning or etching an edge of the passivation layer in which the temperature sensitive layer is formed.

In another example of a temperature sensing apparatus, temperature sensitive layers may be sandwiched between structures, and a loss compensation layer may be formed by patterning or etching an edge of the passivation layer in which the temperature sensitive layer is formed.

Figure 6:
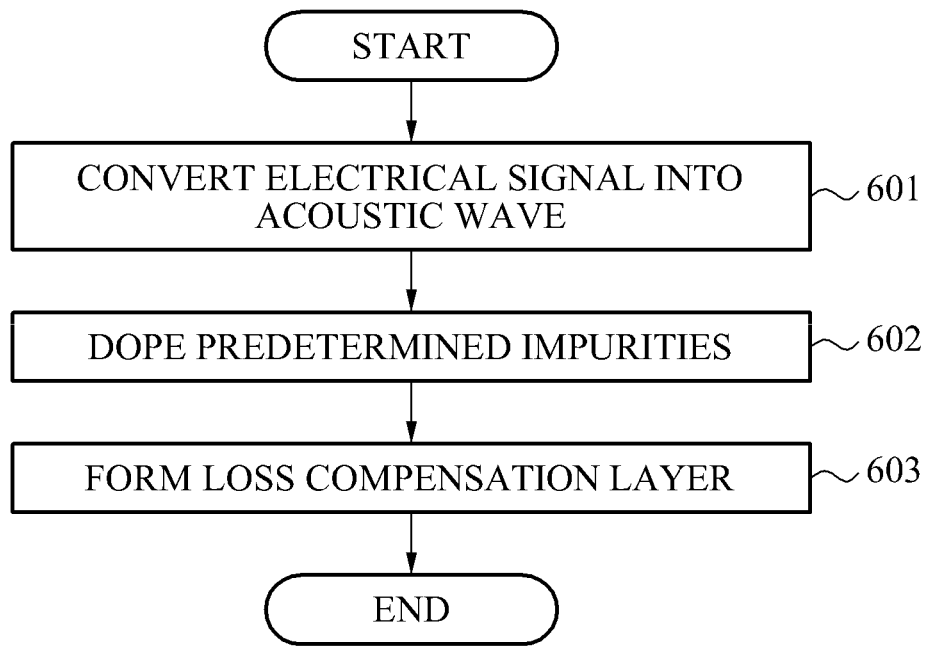
FIG. 6 illustrates an example of an operation of forming a temperature sensitive layer in a temperature sensing apparatus.

FIG. 6 illustrates an example of an operation of forming a temperature sensitive layer in a temperature sensing apparatus.

In 601, the temperature sensing apparatus may convert an electrical signal into an acoustic wave. The electrical signal may be input through or received at an electrode spaced apart by a predetermined distance from a substrate. The temperature sensing apparatus may convert the electrical signal into a physical vibration, and may convert the physical vibration into the acoustic wave.

In 602, the temperature sensing apparatus may dope predetermined impurities in one or more of structures formed on the substrate, and may form a temperature sensitive layer. The predetermined impurities may include one or more of B, P, As, Ge, Sb, Si, and Al. Additionally, the structures formed on the substrate may include one or more of a membrane layer, a bottom electrode, a piezoelectric layer, a top electrode, and a passivation layer.

For example, the temperature sensing apparatus may form a temperature sensitive layer by depositing SiO2 and predetermined impurities in one or more of the structures, using an in-situ process or an implantation process. In this example, SiN may be used instead of SiO2. In an example, the temperature sensing apparatus may form a temperature sensitive layer in the passivation layer. In another example, the temperature sensing apparatus may form temperature sensitive layers in the passivation layer and the membrane layer. In still another example, the temperature sensing apparatus may form temperature sensitive layers to be sandwiched between the structures formed on the substrate. In this example, the temperature sensitive layers may be formed on a top and bottom of the top electrode, and on a top and bottom of the bottom electrode, respectively.

In 603, the temperature sensing apparatus may form a loss compensation layer, by patterning or etching an upper portion of a surface of the temperature sensitive layer.

In an example, the temperature sensing apparatus may form a loss compensation layer by patterning, in the shape of a doughnut, an upper edge of the temperature sensitive layer. For example, the temperature sensing apparatus may deposit on the temperature sensitive layer one or more of Mo, Ru, Au, SiO2, and SiN. The temperature sensing apparatus may also pattern the upper edge of the temperature sensitive layer in the shape of a doughnut.

In another example, the temperature sensing apparatus may form a loss compensation layer by doping predetermined impurities on the temperature sensitive layer, and by patterning, in the shape of a doughnut, the upper edge of the temperature sensitive layer. In this example, the predetermined impurities may include one or more of B, P, As, Ge, Sb, Si, and Al.

In still another example, the temperature sensing apparatus may form a loss compensation layer by etching, in the shape of a doughnut, the upper edge of the temperature sensitive layer.

It is to be understood that in the embodiment of the present invention, the operations in FIG. 6 are performed in the sequence and manner as shown although the order of some steps and the like may be changed without departing from the spirit and scope of the present invention. In accordance with an illustrative example, a computer program embodied on a non-transitory computer-readable medium may also be provided, encoding instructions for performing at least the method described in FIG. 6.

Program instructions to perform a method described in FIG. 6, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Figure 7:
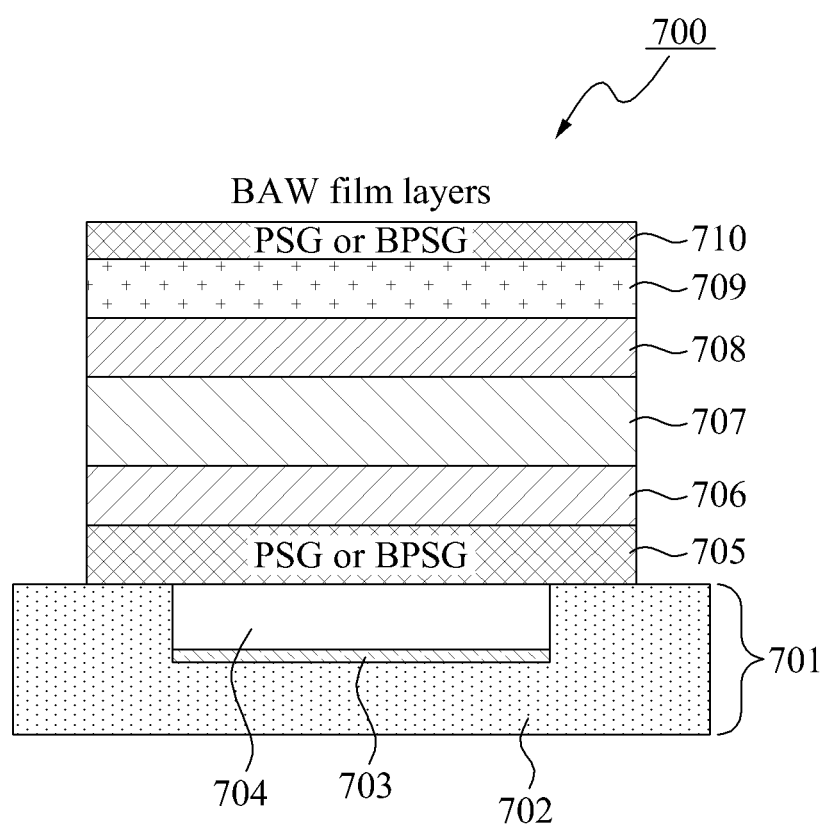
FIG. 7 illustrates an example of an infrared light sensing apparatus including a temperature sensitive layer.

FIG. 7 illustrates an infrared light sensing apparatus 700 including a temperature sensitive layer.

In FIG. 7, a temperature sensitive layer may be formed in a passivation layer 710 included in the infrared light sensing apparatus 700.

Referring to FIG. 7, the infrared light sensing apparatus 700 includes a substrate 701, an infrared light reflection layer 703, a membrane layer 705, a bottom electrode 706, a piezoelectric layer 707, a top electrode 708, an infrared light absorption layer 709, and the passivation layer 710.

The substrate 701, the membrane layer 705, the bottom electrode 706, the piezoelectric layer 707, the top electrode 708, and the passivation layer 710 of FIG. 7 may perform substantially the same functions as the substrate 101, the membrane layer 104, the bottom electrode 105, the piezoelectric layer 106, the top electrode 107, and the passivation layer 108 of FIG. 1, respectively, and, accordingly, further description thereof will be omitted.

The infrared light sensing apparatus 700 of FIG. 7 may be configured by adding the infrared light reflection layer 703 and the infrared light absorption layer 709 to the temperature sensing apparatus 200 of FIG. 2. Accordingly, the following description will be given by focusing on the infrared light reflection layer 703 and the infrared light absorption layer 709.

A plurality of layers may be laminated on the substrate 701, and structures may be formed by doping predetermined impurities in each of the layers. The substrate 701 may be doped with Si 702, and may include, for example, a silicon wafer.

The infrared light reflection layer 703 may be formed in the substrate 701.

The infrared light reflection layer 703 may be located in the substrate 701 and below the membrane layer 705. Additionally, a cavity 704 may be formed between the infrared light reflection layer 703 and the membrane layer 705. The cavity 704 may have, for example, a circular shape, an oval shape, a semicircular shape, or various polygonal shapes, such as a tetragonal shape, a trapezoidal shape, or a rhombic shape.

For example, the infrared light reflection layer 703 may be formed by depositing one or more of Al and titanium (Ti) on the substrate 701. The infrared light reflection layer 703 may reflect infrared light incident through the cavity 704 to the infrared light reflection layer 703, using the one or more of Al and Ti. Specifically, the infrared light reflection layer 703 may reflect the infrared light to one or more of the membrane layer 705, the bottom electrode 706, the piezoelectric layer 707, the top electrode 708, and the infrared light absorption layer 709.

The membrane layer 705 may be used to support the other structures formed on the substrate 701. For example, the membrane layer 705 may be formed by depositing $SiO_2$ or SiN on the substrate 701. Additionally, the membrane layer 705 may support, using $SiO_2$ or SiN, the bottom electrode 706, the piezoelectric layer 707, the top electrode 708, the infrared light absorption layer 709, and the passivation layer 710.

A first temperature sensitive layer may be formed by doping predetermined impurities in the membrane layer 705, using an in-situ process or implantation process. The predetermined impurities may include one or more of B, P, As, Ge, Sb, Si, and Al.

The bottom electrode 706 and the top electrode 708 may each be spaced apart by a predetermined distance from the substrate 701. The bottom electrode 706 and the top electrode 708 may also be formed above the membrane layer 705.

The bottom electrode 706 may be formed by depositing Mo on the membrane layer 705. Additionally, the bottom electrode 706 may be used as either an input electrode, or an output electrode, to apply an electrical signal to the piezoelectric layer 707.

The top electrode 708 may be formed by depositing Ru on the piezoelectric layer 707. Additionally, the top electrode 708 may be used as an input electrode or an output electrode to apply an electrical signal to the piezoelectric 707.

In an example, when the top electrode 708 is used as an input electrode, the bottom electrode 706 may be used as an output electrode. In another example, when the bottom electrode 706 is used as an input electrode, the top electrode 708 may be used as an output electrode.

The piezoelectric layer 707 may convert, into an acoustic wave, an electrical signal received through the top electrode 708 and the bottom electrode 706.

In an example, when the top electrode 708 is used as an input electrode, the piezoelectric layer 707 may receive an electrical signal from the top electrode 708, and may convert the electrical signal into a physical vibration. Additionally, the piezoelectric layer 707 may generate an acoustic wave in the same direction as the physical vibration, within an oriented piezoelectric thin film. In this example, the piezoelectric layer 707 may be formed by depositing AlN on the bottom electrode 706.

The infrared light absorption layer 709 may be formed in one or more of the structures formed on the substrate 701. The infrared light absorption layer 709 may absorb infrared light incident to the infrared light absorption layer 709, and may convert the absorbed infrared light into heat. For example, the infrared light absorption layer 709 may be formed in one or more of the structures located between the infrared light reflection layer 703 and a second temperature sensitive layer.

The infrared light absorption layer 709 may convert the absorbed infrared light into heat, using one or more of amorphous silicon (a-Si), vanadium oxide (VO2), and chromium (Cr).

For example, the infrared light absorption layer 709 may be formed by depositing one or more of a-Si, VO2, and Cr in one or more of the membrane layer 705, the bottom electrode 706, the piezoelectric layer 707, and the top electrode 708.

Additionally, the infrared light absorption layer 709 may absorb infrared light reflected from the infrared light reflection layer 703, and infrared light incident through the second temperature sensitive layer. The infrared light absorption layer 709 may convert the absorbed infrared light into heat, using one or more of a-Si, VO2, and Cr. Subsequently, the first temperature sensitive layer and the second temperature sensitive layer may detect a change in a temperature of the heat converted by the infrared light absorption layer 709. Additionally, the first temperature sensitive layer and the second temperature sensitive layer may detect a change in a resonant frequency based on a change in the temperature, and may detect a change in infrared light based on the change in the resonant frequency.

The passivation layer 710 may be used to protect the other structures formed on the substrate 701.

Additionally, the second temperature sensitive layer may be formed by doping predetermined impurities in the passivation layer 710. The predetermined impurities may include one or more of B, P, As, Ge, Sb, Si, and Al.

Similarly to the first temperature sensitive layer, the in-situ process or implantation process may be used to dope the predetermined in the passivation layer 710 to form the second temperature sensitive layer.

As described above, the infrared light sensing apparatus 700 of FIG. 7 detects the change in the infrared light using a single infrared light absorption layer, however, a person of ordinary skill in the relevant art will appreciate that this is one exemplary configuration. Accordingly, the infrared light sensing apparatus 700 may include at least one infrared light absorption layer. For example, the infrared light sensing apparatus 700 may include infrared light absorption layers sandwiched between the structures, similarly to the temperature sensitive layers included in the temperature sensing apparatus 300 of FIG. 3.

Additionally, the infrared light sensing apparatus 700 may include two temperature sensitive layers, however, a person of ordinary skill in the relevant art will appreciate that this is one exemplary configuration. Accordingly, the infrared light sensing apparatus 700 may include a single temperature sensitive layer, and at least one infrared light absorption layer. For example, the infrared light sensing apparatus 700 may be configured by adding at least one infrared light absorption layer to the temperature sensing apparatus 100 of FIG. 1 including a single temperature sensitive layer.

Furthermore, the infrared light sensing apparatus 700 may include at least three temperature sensitive layers and at least one infrared light absorption layer. In an example, the infrared light sensing apparatus 700 may be configured by adding at least one infrared light absorption layer to the temperature sensing apparatus 300 of FIG. 3, in which temperature sensitive layers are sandwiched between the structures. In another example, the infrared light sensing apparatus 700 may be configured by adding at least one infrared light absorption layer to the temperature sensing apparatus 400 of FIG. 4, including a loss compensation layer with a doughnut shape. In still another example, the infrared light sensing apparatus 700 may be configured by adding at least one infrared light absorption layer to the temperature sensing apparatus 500 of FIG. 5, including a loss compensation layer formed through patterning.

Figure 8:
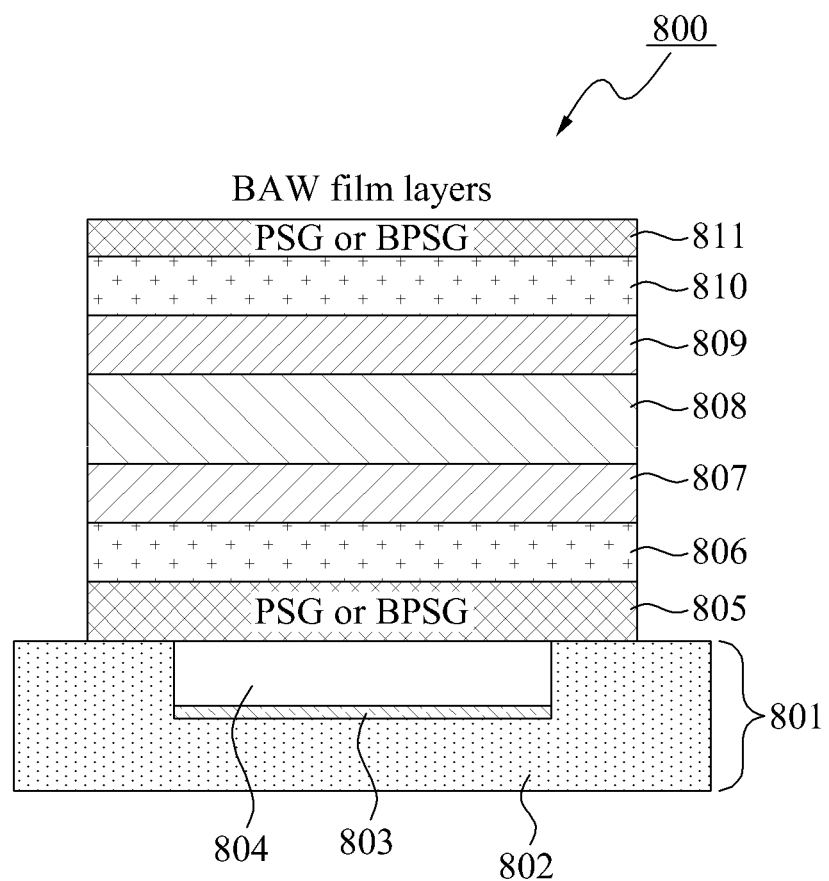
FIG. 8 illustrates an example of an infrared light sensing apparatus including a plurality of infrared light absorption layers formed between structures.

FIG. 8 illustrates an infrared light sensing apparatus 800 including a plurality of infrared light absorption layers formed between structures.

Referring to FIG. 8, the infrared light sensing apparatus 800 includes a substrate 801, an infrared light reflection layer 803, a membrane layer 805, a first infrared light absorption layer 806, a bottom electrode 807, a piezoelectric layer 808, a top electrode 809, a second infrared light absorption layer 810, and a passivation layer 811.

The infrared light sensing apparatus 800 of FIG. 8 may be configured by adding a plurality of infrared light absorption layers to the infrared light sensing apparatus 700 of FIG. 7. In other words, the substrate 801, the infrared light reflection layer 803, the membrane layer 805, the bottom electrode 807, the piezoelectric layer 808, the top electrode 809, and the passivation layer 811 of FIG. 8 may perform substantially the same functions as the substrate 701, the infrared light reflection layer 703, the membrane layer 705, the bottom electrode 706, the piezoelectric layer 707, the top electrode 708, and the passivation layer 710 of FIG. 7, respectively, and, accordingly, further description thereof will be omitted.

A plurality of layers may be laminated on the substrate 801, and structures may be formed by doping predetermined impurities in each of the layers. The substrate 801 may be doped with Si 802, and may include, for example, a silicon wafer.

The infrared light reflection layer 803 may be formed in the substrate 801.

The infrared light reflection layer 803 may be located in the substrate 801 and below the membrane layer 805. Additionally, a cavity 804 may be formed between the infrared light reflection layer 803 and the membrane layer 805. The cavity 804 may have, for example, a circular shape, an oval shape, a semicircular shape, or various polygonal shapes, such as a tetragonal shape, a trapezoidal shape, or a rhombic shape.

For example, the infrared light reflection layer 803 may be formed by depositing one or more of Al and Ti on the substrate 801. The infrared light reflection layer 803 may reflect, using the one or more of Al and Ti, infrared light incident through the cavity 804 to the infrared light reflection layer 803. Specifically, the infrared light reflection layer 803 may reflect the infrared light to one or more of the membrane layer 805, the first infrared light absorption layer 806, the bottom electrode 807, the piezoelectric layer 808, the top electrode 809, and the second infrared light absorption layer 810.

The membrane layer 805 may be used to support the other structures formed on the substrate 801. For example, the membrane layer 805 may be formed by depositing SiO2 or SiN on the substrate 801.

A first temperature sensitive layer may be formed by doping predetermined impurities in the membrane layer 805, using an in-situ process or implantation process. The predetermined impurities may include one or more of B, P, As, Ge, Sb, Si, and Al.

The first infrared light absorption layer 806 may be formed by depositing one or more of a-Si, VO2, and Cr on the membrane layer 805. Additionally, the first infrared light absorption layer 806 may absorb infrared light incident from a lower portion of the first infrared light absorption layer 806 through the infrared light reflection layer 803. The first infrared light absorption layer 806 may also absorb infrared light incident from an upper portion of the first infrared light absorption layer 806. The first infrared light absorption layer 806 may convert the absorbed infrared light from a lower portion of the first infrared light absorption layer 806 and from the upper portion of the first infrared light absorption layer 806 into heat. Subsequently, the first temperature sensitive layer may detect a change in a resonant frequency by detecting a change in a temperature of the heat converted by the first infrared light absorption layer 806. The first temperature sensitive layer may detect a change in infrared light based on the change in the resonant frequency.

The bottom electrode 807 and the top electrode 809 may each be spaced apart by a predetermined distance from the substrate 801. The bottom electrode 807 and the top electrode 809 may be formed above the membrane layer 805.

The bottom electrode 807 may be formed by depositing Mo on the membrane layer 805. Additionally, the bottom electrode 807 may be used as an input electrode or an output electrode to apply an electrical signal to the piezoelectric layer 808.

The top electrode 809 may be formed by depositing Ru on the piezoelectric layer 808. Additionally, the top electrode 809 may be used as an input electrode or an output electrode to apply an electrical signal to the piezoelectric 808.

The piezoelectric layer 808 may convert, into an acoustic wave, an electrical signal input through or received at the top electrode 809 and the bottom electrode 807.

In an example, when the top electrode 809 is used as an input electrode, the piezoelectric layer 808 may receive an electrical signal from the top electrode 809, and may convert the electrical signal into a physical vibration. Additionally, the piezoelectric layer 808 may generate an acoustic wave in the same direction as the physical vibration, within an oriented piezoelectric thin film. In this example, the piezoelectric layer 808 may be formed by depositing AlN on the bottom electrode 807.

The second infrared light absorption layer 810 may be formed between the top electrode 809 and the passivation layer 811, by depositing one or more of a-Si, VO2, and Cr on the top electrode 809. Additionally, the second infrared light absorption layer 810 may absorb infrared light incident to an upper portion of the second infrared light absorption layer 810, and infrared light reflected from the infrared light reflection layer 803. The second infrared light absorption layer 810 may convert the absorbed infrared lights into heat, using one or more of a-Si, VO2, and Cr.

Subsequently, the second temperature sensitive layer may detect a change in a resonant frequency by detecting a change in a temperature of the heat converted by the second infrared light absorption layer 810. The second temperature sensitive layer may also detect a change in infrared light based on the change in the resonant frequency.

The second infrared light absorption layer 810 may absorb infrared light incident from a lower portion of the second infrared light absorption layer 810 through the infrared light reflection layer 803, and infrared light incident from the upper portion of the second infrared light absorption layer 810, and may convert the absorbed infrared light into heat. For example, the second infrared light absorption layer 810 may be formed in one or more of structures located between the infrared light reflection layer 803 and the second temperature sensitive layer.

The second infrared light absorption layer 810 may convert the absorbed infrared light into heat using one or more of a-Si, VO2, and Cr.

For example, the second infrared light absorption layer 810 may be formed by depositing one or more of a-Si, VO2, and Cr in one or more of the membrane layer 805, the bottom electrode 807, the piezoelectric layer 808, and the top electrode 809.

Additionally, the second infrared light absorption layer 810 may absorb infrared light reflected from the infrared light reflection layer 803, and infrared light incident through the second temperature sensitive layer. The second infrared light absorption layer 810 may convert the absorbed infrared lights into heat, using one or more of a-Si, VO2, and Cr. Subsequently, the first temperature sensitive layer and the second temperature sensitive layer may detect a change in a temperature of the heat converted by the second infrared light absorption layer 810. Additionally, the first temperature sensitive layer and the second temperature sensitive layer may detect a change in a resonant frequency based on a change in the temperature. The first temperature sensitive layer and the second temperature sensitive layer may also detect a change in infrared light based on the change in the resonant frequency.

The passivation layer 811 may be used to protect the other structures formed on the substrate 801.

Additionally, the second temperature sensitive layer may be formed by doping predetermined impurities in the passivation layer 811. The predetermined impurities may include one or more of B, P, As, Ge, Sb, Si, and Al. Similarly to the first temperature sensitive layer, the in-situ process or implantation process may be used to dope the predetermined in the passivation layer 811 to form the second temperature sensitive layer.

For illustrative purposes, the infrared light sensing apparatus 800 of FIG. 8 includes two infrared light absorption layers including, but not limited to, the first infrared light absorption layer 806 and the second infrared light absorption layer 810. In another example, the infrared light sensing apparatus 800 of FIG. 8 may include at least three infrared light absorption layers. For example, the infrared light sensing apparatus 800 may further include an infrared light absorption layer between the bottom electrode 807 and the piezoelectric layer 808. The infrared light sensing apparatus 800 may further include an infrared light absorption layer between the piezoelectric layer 808 and the top electrode 809. As a number of infrared light absorption layers increases, sensitivity to detect a change in infrared light due to a change in a temperature may be improved.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for sensing a temperature, the apparatus comprising:
    an electrode spaced apart by a distance from a substrate;
    a piezoelectric layer configured to convert an electrical signal into an acoustic wave, wherein the electrical signal is input through the electrode;
    a temperature sensitive layer formed in one or more structures formed on the substrate, wherein the temperature sensitive layer is doped with impurities; and
    a passivation layer configured to protect the electrode and the piezoelectric layer, wherein the electrode and the piezoelectric layer are formed on the substrate,
    wherein the temperature sensitive layer is formed in the passivation layer by doping the impurities in the passivation layer.

2. The apparatus of claim 1, wherein the temperature sensitive layer is formed by doping the impurities in silicon dioxide (SiO2) or silicon nitride (SiN).

3. The apparatus of claim 1, wherein the impurities comprise one or more of boron (B), phosphorus (P), arsenic (As), germanium (Ge), Stibium (Sb), silicon (Si), and aluminum (Al).

4. The apparatus of claim 1, wherein the temperature sensitive layer is doped with the impurities using an in-situ process or implantation process.

5. The apparatus of claim 1, further comprising:
a membrane layer configured to support structures formed on the substrate,
wherein the membrane layer is formed on the substrate, and
wherein the temperature sensitive layer is formed in the membrane layer by doping the impurities in the membrane layer.

6. The apparatus of claim 1, wherein the electrode comprises:
a top electrode formed on a top of the piezoelectric layer; and
a bottom electrode formed on a bottom of the piezoelectric layer,
wherein temperature sensitive layers are formed on a top and a bottom of the top electrode, and a top and bottom of the bottom electrode layer.

7. The apparatus of claim 1, further comprising:
a loss compensation layer formed by patterning an edge of the temperature sensitive layer.

8. The apparatus of claim 1, further comprising:
a loss compensation layer formed in a shape of a doughnut on the temperature sensitive layer.

9. The apparatus of claim 8, wherein the loss compensation layer is formed by depositing one or more of molybdenum (Mo), ruthenium (Ru), gold (Au), SiO2, and SiN on the temperature sensitive layer, and by patterning an upper edge of the temperature sensitive layer.

10. The apparatus of claim 8, wherein the loss compensation layer is formed by doping the impurities in one or more of SiO2 and SiN, deposited on the temperature sensitive layer, and by patterning an upper edge of the temperature sensitive layer.

11. The apparatus of claim 1, wherein the temperature sensitive layer is formed by depositing a phosphosilicate glass (PSG) or boronphosphorussilicate glass (BPSG) in the passivation layer.

12. A method of sensing a temperature, the method comprising:
receiving an electrical signal at an electrode spaced apart by a distance from a substrate;
converting the electrical signal into an acoustic wave; and
doping impurities in one or more structures formed on the substrate,
wherein the doping comprises doping the impurities in a passivation layer formed on the substrate.

13. The method of claim 12, wherein the doping comprises doping the impurities in silicon dioxide (SiO2) or silicon nitride (SiN).

14. The method of claim 12, further comprising:
configuring the impurities to comprise one or more of boron (B), phosphorus (P), arsenic (As), germanium (Ge), Stibium (Sb), silicon (Si), and aluminum (Al).

15. The method of claim 12, wherein the doping comprises doping the impurities using an in-situ process or implantation process.

16. The method of claim 12, wherein the doping comprises doping the impurities in a membrane layer formed on the substrate.

17. The method of claim 12, wherein the doping comprises doping the impurities in a top and a bottom of a top electrode formed on a top of the substrate, and a top and a bottom of a bottom electrode formed on a bottom of the substrate.

18. The method of claim 12, further comprising:
patterning an edge of the temperature sensitive layer.

19. The method of claim 12, further comprising:
depositing a Q-factor improvement material on the temperature sensitive layer in a shape of a doughnut.

20. An apparatus for sensing infrared light, the apparatus comprising:
an infrared light reflection layer configured to upwardly reflect infrared light, wherein the infrared light reflection layer is formed on a substrate;
an electrode spaced apart by a distance from the substrate;
a piezoelectric layer configured to convert an electrical signal into an acoustic wave, wherein the electrical signal is input through the electrode;
a temperature sensitive layer formed in one or more structures formed on the substrate, wherein the temperature sensitive layer is doped with impurities; and
an infrared light absorption layer configured to absorb the infrared light and to convert the absorbed infrared light into heat, wherein the infrared light absorption layer is formed below the temperature sensitive layer; and
a passivation layer configured to protect the electrode and the piezoelectric layer, wherein the electrode and the piezoelectric layer are formed on the substrate,
wherein the temperature sensitive layer is formed in the passivation layer by doping the impurities in the passivation layer.

21. The apparatus of claim 20, wherein the infrared light absorption layer converts the absorbed infrared light into the heat, using one or more of amorphous silicon (a-Si), vanadium oxide (VO2), and chromium (Cr).

22. The apparatus of claim 20, wherein the infrared light absorption layer is formed in one or more of the structures located between the infrared light reflection layer and the temperature sensitive layer.

23. The apparatus of claim 20, wherein the temperature sensitive layer detects a change in a resonant frequency based on a change in a temperature of the heat using one or more of boron (B), phosphorus (P), arsenic (As), germanium (Ge), Stibium (Sb), silicon (Si), and aluminum (Al).

24. The apparatus of claim 20, wherein the infrared light reflection layer reflects the infrared light using one or more of Al and titanium (Ti).

25. The apparatus of claim 20, wherein the infrared light absorption layer absorbs the infrared light reflected from the infrared light reflection layer and infrared light incident through the temperature sensitive layer, and converts the absorbed infrared light into heat.

26. A method of sensing infrared light, the method comprising:
upwardly reflecting infrared light;
receiving an electrical signal at an electrode spaced apart by a distance from a substrate;
converting the electrical signal into an acoustic wave;
doping impurities in one or more structures formed on the substrate, wherein the doping comprises doping the impurities in a passivation layer formed on the substrate; and
absorbing the infrared light and converting the absorbed infrared light into heat.

27. The method of claim 26, wherein the absorbing comprises converting the absorbed infrared light into the heat, and using one or more of amorphous silicon (a-Si), vanadium oxide (VO2), and chromium (Cr).

28. The method of claim 26, wherein the doping comprises detecting a change in a resonant frequency based on a change in a temperature of the heat, and using one or more of boron (B), phosphorus (P), arsenic (As), germanium (Ge), Stibium (Sb), silicon (Si), and aluminum (Al).

29. The method of claim 26, wherein the reflecting comprises reflecting the infrared light using one or more of Al and titanium (Ti).

* * * * *